(12) United States Patent
Shaffer et al.

(10) Patent No.: US 7,023,839 B1
(45) Date of Patent: Apr. 4, 2006

(54) SYSTEM AND METHOD FOR DYNAMIC CODEC ALTERATION

(75) Inventors: Shmuel Shaffer, Palo Alto, CA (US); William Joseph Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/378,196

(22) Filed: Aug. 19, 1999

Related U.S. Application Data

(63) Continuation-in-part of application No. 09/238,671, filed on Jan. 26, 1999, now Pat. No. 6,757,277.

(51) Int. Cl.
  *H04L 12/56* (2006.01)
(52) U.S. Cl. ...................... 370/356; 370/468
(58) Field of Classification Search ............... 370/356, 370/351, 352, 395.1, 395.2, 395.21, 395.41, 370/395.52, 395.53, 401, 411, 444, 455, 465–466, 370/468, 477, 493, 235–236, 254–255, 901–902, 370/905, 908; 709/223–224, 226; 455/67.1, 455/450, 509
See application file for complete search history.

(56) References Cited

U.S. PATENT DOCUMENTS

| | | | |
|---|---|---|---|
| 5,546,395 A | 8/1996 | Sharma et al. | 370/84 |
| 5,835,495 A | 11/1998 | Ferriere | 370/465 |
| 5,857,147 A * | 1/1999 | Gardner et al. | 455/67.1 |
| 6,081,513 A * | 6/2000 | Roy | 370/260 |
| 6,085,241 A * | 7/2000 | Otis | 709/223 |
| 6,175,856 B1 * | 1/2001 | Riddle | 709/204 |
| 6,201,805 B1 * | 3/2001 | Strathmeyer | 370/356 |
| 6,324,184 B1 * | 11/2001 | Hou et al. | 370/468 |
| 6,404,776 B1 * | 6/2002 | Voois et al. | 370/468 |
| 6,424,624 B1 | 7/2002 | Galand et al. | |
| 6,426,945 B1 | 7/2002 | Sengodan | |
| 6,457,043 B1 | 9/2002 | Kwak et al. | |
| 2002/0093982 A1 | 7/2002 | Joy et al. | |

FOREIGN PATENT DOCUMENTS

| | | |
|---|---|---|
| WO | WO 95/22818 | 8/1995 |
| WO | WO 95/22818 A1 | 8/1995 |

OTHER PUBLICATIONS

Copy of European Search Report for EP Appln. No. 00300467.8; date search was completed: May 25, 2000.
Paksoy et al., "Variable Rate Speech Coding For Multiple Access Wireless Networks," *IEEE Proceedings of the Mediterranean ElectroTechnical Conference,*, 1994, pp. 47-50.

(Continued)

*Primary Examiner*—Brian Nguyen

(57) ABSTRACT

A bandwidth adjustment server (BWAS) (109) is provided which monitors system bandwidth usage, sends requests to terminals (102A, 102B and/or 106), to identify their coding capabilities, and directs each of the terminals to adjust their coding algorithms based on system bandwidth usage. If system bandwidth usage is high, the BWAS (109) requires the terminals to employ a less bandwidth intensive coding algorithm; similarly, when system bandwidth usage is low, the BWAS (109) will allow the terminals to employ higher bandwidth use coding algorithms. Codec renegotiation may be initiated if there is a disparity between the bandwidth allocated to new connections versus ongoing connections or an increase in data traffic.

14 Claims, 8 Drawing Sheets

OTHER PUBLICATIONS

Tham, "H.323: The Multimedia Communications Standard for Local Area Networks," *IEEE Communications Magazine*, Dec. 1996, pp. 52-56.

Thom, Gary A., "H.323: The Multimedia Communications Standard for Local Area Networks", *IEEE Communications Magazine*, US IEEE Service Center. Piscataway, N.J., Dec. 1, 1996, vol. 34, No. 12, pp. 52-56, p. 52, right-hand column, line 30-p. 53, left-hand column, line. 33.

European Search Report Application No. EP 00 30 0466, completed May 10, 2000.

* cited by examiner

US 7,023,839 B1

SYSTEM AND METHOD FOR DYNAMIC CODEC ALTERATION

CROSS REFERENCE TO RELATED APPLICATION

The present application is a continuation-in-part of U.S. patent application Ser. No. 09/238,671, entitled "System and Method for Coding Algorithm Policy Adjustment in Telephony-Over-LAN Networks" (with inventors Shmuel Shaffer, William J. Beyda and Uwe Wrede), filed Jan. 26, 1999, now U.S. Pat. No. 6,757,277.

BACKGROUND OF THE INVENTION

The present invention relates to telecommunications systems, and in particular, to an improved telephony-over-LAN (local area network) system.

Modern telephony-over-LAN (ToL) systems allow each endpoint (e.g., client, gateway) to choose a default hierarchy of coding algorithms. For example, an endpoint might be configured to first try using adaptive pulse code modulation (ADPCM), next G.723, then GSM, etc., until a common codec supported by both the calling and called endpoints is found.

However, the endpoints or clients typically have static configurations of preferred codecs. As a consequence, network bandwidth is assigned on a simple availability basis, without regard to other users who might wish to place phone calls in the future. As a consequence, a few users who communicate using coding algorithms that result in high bandwidth consumption could use the entire network bandwidth, without even realizing bandwidth was in short supply, thereby preventing others from placing calls. As such, system bandwidth may be inefficiently utilized and even result in denial of service to some users. Moreover, subsequently callers with a higher QoS (quality of service) may be forced to use a less optimal codec while a preceding call with a low QoS communicates using its desired codec.

While certain data modems, such as described in U.S. Pat. No. 5,546,395, allow for dynamic bandwidth adjustment between two communicating endpoints, by way of selecting the compression rates for voice transmission and the modulation rate, such systems do not allow for broad network-based supervision of bandwidth allocation.

SUMMARY OF THE INVENTION

These and other drawbacks in the prior art are overcome in large part by a coding algorithm policy adjustment system according to the present invention. A bandwidth adjustment server or bandwidth allocation server (BWAS) is provided which monitors system bandwidth usage, sends requests to user terminals to identify their coding capabilities, and directs each of the user terminals to adjust their coding algorithms based on system bandwidth usage. If system bandwidth usage is high, the BWAS requires the user terminals to employ a less bandwidth-intense coding algorithm; similarly, when system bandwidth usage is low, the BWAS will allow the user terminals to employ higher bandwidth-use coding algorithms.

The BWAS is configured with a first threshold identified as the threshold for reducing the coder/decoder (codec) speeds of the idle endpoints. The BWAS monitors system traffic, or communicates with other system monitors to determine system bandwidth usage. The BWAS sends a message to the user terminals, requiring them to identify their coding capabilities and the specific hierarchy used by them. Once this information is returned to the BWAS, the BWAS sends another message requiring the user terminals to lower their bandwidth usage by selecting a lower speed codec. When network traffic drops below a second preconfigured threshold, the BWAS sends another message allowing the user terminals to restore their original codec choices.

The BWAS according to one embodiment monitors bandwidth usage, and if there is a disparity between the bandwidth allocated to new connections versus ongoing ones or an increase in data traffic, the BWAS sends a Lower Codec Speed message to all active H.323 entities. This causes the H.323 entities to renegotiate their codecs. The original calling party then selects a lower speed codec and sends a message to the called party to proceed with H.323 codec negotiation.

A better understanding of the invention is obtained when the following detailed description is considered in conjunction with the following drawings.

DETAILED DESCRIPTION OF THE INVENTION

Figure 1:
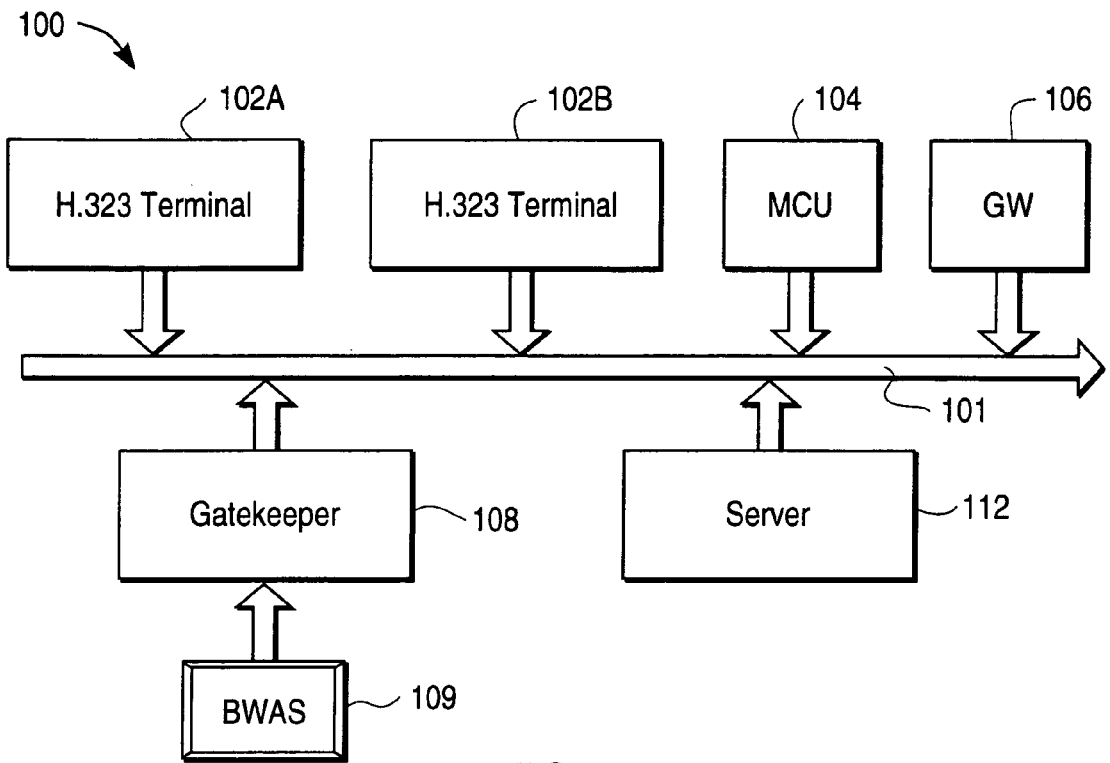
FIG. 1 is a diagram illustrating a telecommunications system according to an embodiment of the invention.

FIG. 1 is a diagram illustrating a telecommunications system 100 according to an embodiment of the present invention. In particular, the telecommunications system 100 includes a local area network (LAN) or packet network 101. Coupled to the LAN 101 may be a variety of H.323 terminals 102A, 102B, a multi-point control unit (MCU) 104, an H.323 gateway 106, an H.323 gatekeeper 108, a LAN server 112 and a plurality of other devices such as personal computers (not shown). The H.323 terminals 102A, 102B are in compliance with the H.323 standard. Thus, the H.323 terminals 102A, 102B support H.245 for negotiation of channel usage, Q.931 for call signaling and call setup, registration admission status (RAS), and RTP/RTCP for sequencing audio and video packets. The H.323 terminals 102A, 102B may further implement audio and video codecs, T.120 data conferencing protocols and MCU capabilities. Further details concerning the Recommendation H.323 may be obtained from the International Telecommunications Union (ITU); the Recommendation is hereby incorporated by reference in its entirety as if fully set forth herein. In addition, the gatekeeper 108 has coupled thereto a bandwidth allocation server (BWAS) 109 according to a specific embodiment of the invention. As will be discussed in greater detail below, the BWAS 109 monitors system bandwidth usage and directs each H.323 terminal to adopt a particular codec or coding algorithm according to bandwidth availability. It is noted that in other specific embodiments the BWAS functionality may also be incorporated into the gatekeeper 108, placed on any terminal or server, or embodied as a separate unit separately coupled to the network 101, as long as the BWAS can communicate with the endpoints. Thus, the figures are merely exemplary.

Figure 2:
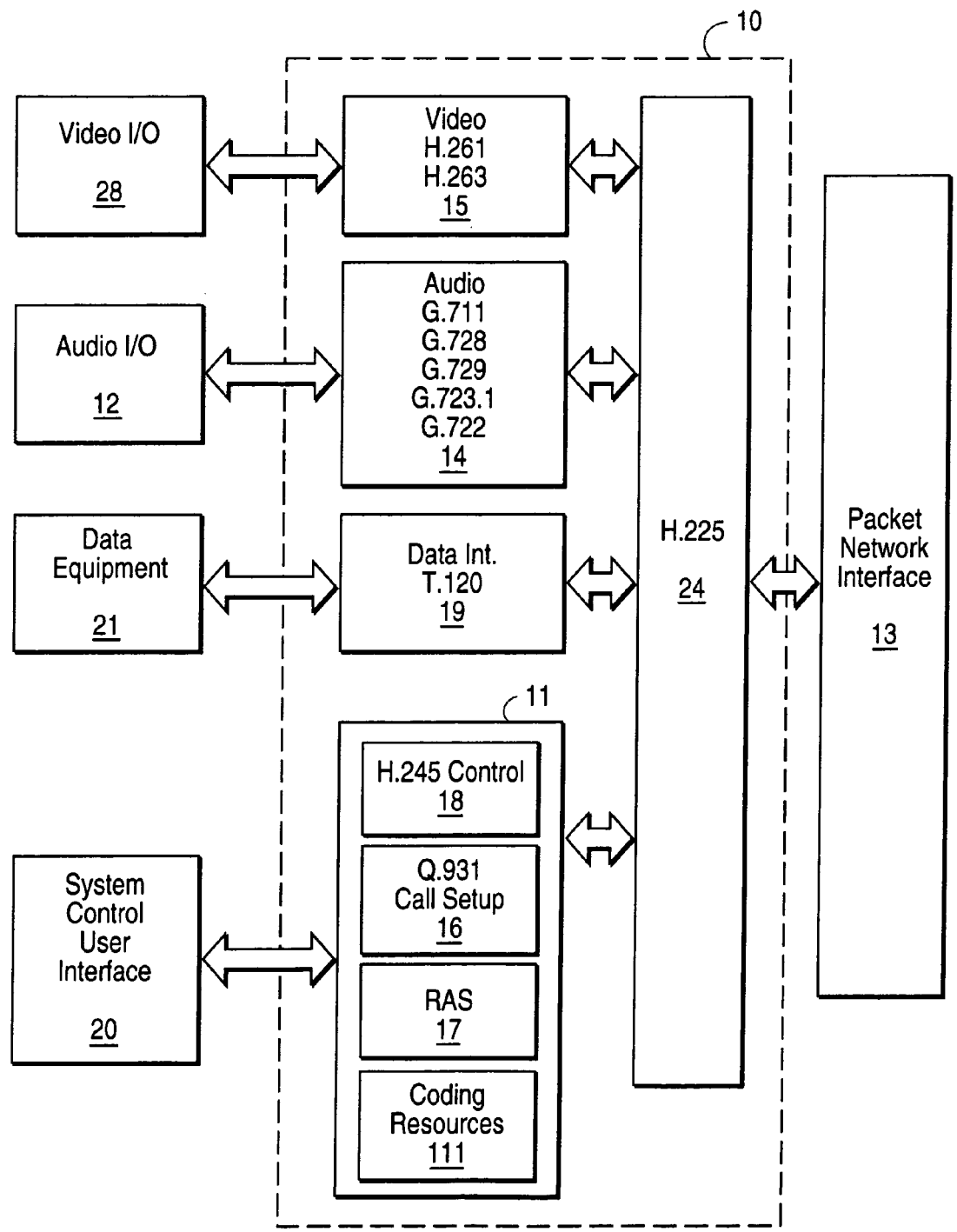
FIG. 2 is a diagram of an exemplary H.323 interface according to an embodiment of the invention.

A logical diagram of an H.323 interface to LAN 101 is shown in FIG. 2, according to an embodiment of the present invention. The interface includes a known network terminal/device 10 utilizing the ITU-T H.323 protocol, and a packet network interface 13 that is coupled to network terminal 10. Network interface 13 couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The network terminal 10 is coupled to a video input/output (I/O) interface 28, an audio I/O interface 12, a user application interface 19, and a system control user interface (SCUI) 20. Network terminal 10 also includes an H.225 layer 24, a video coder/decoder (codec) 15, an audio codec 14, H.245 protocol functionality 18, Q.931 protocol functionality 16, and RAS protocol functionality 17.

As seen in FIG. 2, the video I/O interface 28 which may be part of the standard H.323 device connects to the video codec 15 such as an H.261 codec for encoding and decoding video signals. Coupled between video I/O interface 28 and H.225 layer 24, video codec 15 translates encoded video signals to H.225 protocol signals. Although the H.261 codec can be the video codec used for an H.323 terminal, other video codecs, such as H.263 codecs and others, may also be used for encoding and decoding video. The H.245 protocol is used to exchange terminal capability information such as the video coding algorithm. Generally, the called terminal specifies its capabilities to the calling terminal.

Audio I/O interface 12, which may be part of a standard H.323 terminal, connects to the audio codec 14, such as a G.711 codec, for encoding and decoding audio signals. Coupled to audio I/O interface 12, audio codec 14 is coupled to H.225 layer 24 and translates audio signals to H.225 protocol signals. Although the G.711 codec is the mandatory audio codec for an H.323 terminal, other audio codecs, such as G.728, G.729, G.723.1, G.722, MPEG1 audio, etc. may also be used for encoding and decoding speech, in accordance with the present invention. G.723.1 typically is a preferred codec because of its reasonably low bit rate, which enables preservation of link bandwidth, particularly in slower speed network connections. As is known, when communicating, H.323 terminals use a common coding algorithm or codec supported by all entities to the conversation/conference. This information is exchanged during an H.245 capability exchange phase.

The control layer 11 interfaced with SCUI 20 provides signaling and flow control for proper operation of the H.323 terminal. In particular, all non-audio and non-video control signaling is handled via SCUI 20. Coupled to SCUI 20 in the control layer 11 are H.245 layer 18, Q.931 layer 16 and RAS layer 17, which couple to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. The H.225 standard layer 24, which is derived from the Q.931 standard, is the protocol for establishing connection between two or more H.323 terminals and also formats the transmitted video, audio, data and control streams into messages for output to the network interface 13 (e.g., transport over IP network 101). The H.225 layer 24 also retrieves the received video, audio, data and control streams from messages that have been input from network interface 13.

In addition, in accordance with the present invention, the H.323 terminal's control layer 11 may also include a coding resources unit 111 which is used to communicate coding resources to the bandwidth allocation server (BWAS), as will be described further below. User application interface 19, which may be a T.120 protocol interface as well as other types of protocol interfaces, also is coupled between H.225 layer 24 and a user device 21, which may be for example data equipment. Thus, an H.323 network may be configured to include several different devices. For example, the network may include a terminal for enabling users connected to a LAN to speak, a terminal (i.e., gateway) for enabling a caller resident on the LAN to call a second user through the public switched network, and/or a terminal for enabling the adapter to communicate through a wireless trunk, using a wireless telephone. The device may also implement supplementary services according to the H.450 protocol specification.

The H.323 gateway 106 (FIG. 1) generally provides a translation function between H.323 conferencing endpoints and other terminal types and performs call setup and clearing on both the LAN side and switched circuit network (e.g., public switched telephone network or PSTN) side. The H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing. Further, according to a specific embodiment of the present invention, the gatekeeper 108 may include BWAS 109 which is used to specify coding algorithms (e.g., audio, video and/or both) which may be used by particular H.323 terminals, based on available system bandwidth. The BWAS 109 communicates the required coding algorithm to the H.323 terminals using RAS messaging. The H.323 terminals then use standard H.245 signaling to negotiate coding capabilities among themselves. It is noted that, while described primarily with regard to audio coding, the present invention is equally applicable to video coding as well.

Figure 3:
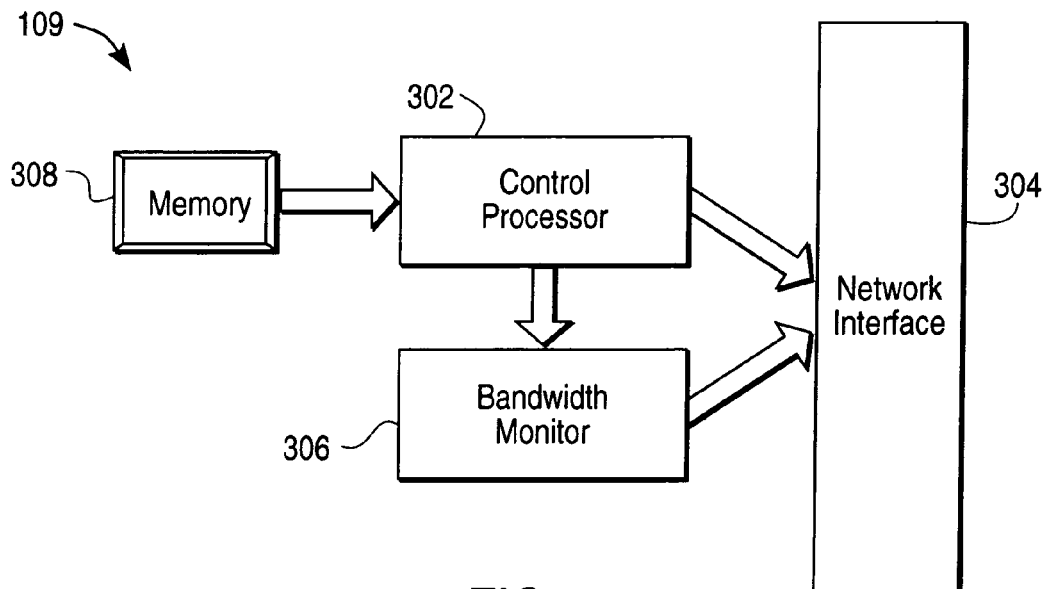
FIG. 3 is a diagram illustrating an exemplary bandwidth allocation server (BWAS) according to an embodiment of the invention.

More particularly, an exemplary BWAS 109 is illustrated in FIG. 3. The BWAS 109 includes a network interface 304 (which may simply be part of the standard gatekeeper interface in some embodiments) which allows for communication to and from the network terminals. In particular, RAS messaging may be employed by BWAS 109 to control bandwidth usage by defining the codecs that may be used by the idle H.323 terminals.

A bandwidth monitor 306 and a control processor 302 are coupled to the network interface 304. The bandwidth monitor 306 monitors bandwidth usage, for example, by counting the number of active calls being processed by the gatekeeper or by other known methods, e.g., monitoring bit rates. The control processor 302 is coupled to a memory 308 which is used to store bandwidth threshold information, for example in the form of look-up tables. The memory 308 may also be used to store information concerning the coding capabilities of each of the H.323 terminals. In the discussion below, "H.323 terminals" may be any H.323 endpoint such as an H.323 client or an H.323 connection in gateway 106. The control processor 302 supervises coding request transmissions, reception of the coding information, and determination of whether a coding adjustment is necessary. In specific embodiments, the BWAS 109 continuously monitors traffic on the local segment to determine whether traffic has crossed any thresholds, and BWAS 109 may communicate with other monitoring agents located on other segments to determine their bandwidth usage. Therefore, BWAS 109 can measure and track the network traffic to make the determinations of the relevant thresholds being crossed, as discussed below. In other embodiments, the BWAS 109 also maintains a database of ongoing calls, their bandwidth usage, and their QoS (quality of service) requirements. In particular, the BWAS 109 is dynamically aware of whether ongoing calls are at or below their requested QoS. If one or more new calls require a higher QoS (i.e., bandwidth), then the BWAS 109 determines whether lower QoS calls may be reset to a still lower QoS codec, as will be discussed below.

Figure 4:
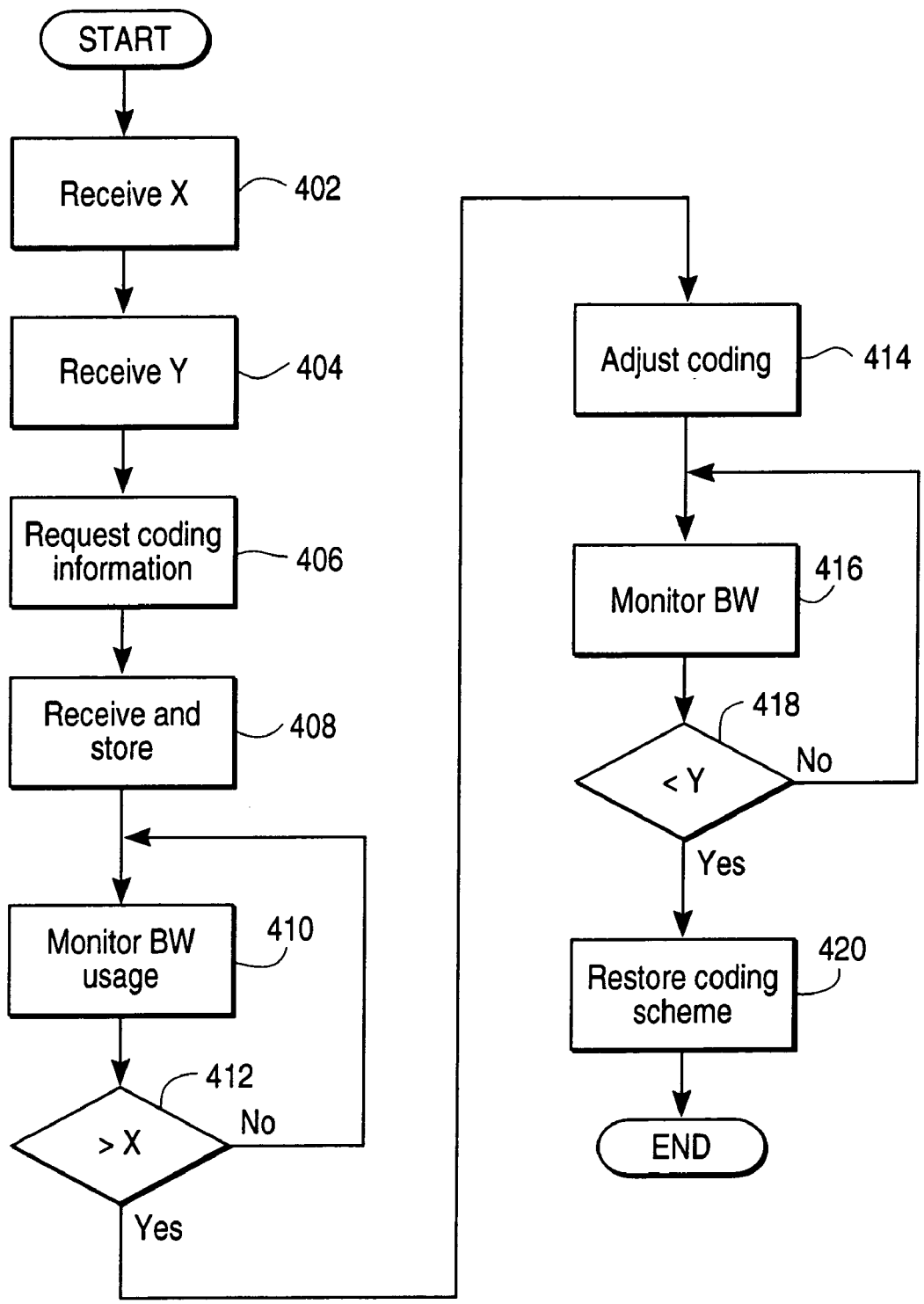
FIG. 4 is a flowchart illustrating operation of an embodiment of the invention.

As an example, a flowchart illustrating operation of one embodiment of the invention is shown in FIG. 4. In a step 402, the bandwidth allocation server (BWAS) 109 receives configuration information concerning the bandwidth threshold X, which is the threshold that must be met before reducing codec speeds. The threshold X, typically measured in Megabits per second (Mbps), is stored in the memory 308. In a step 404, the BWAS 109 similarly receives configuration information concerning the threshold Y, which is the threshold that must be met before restoring coding algorithm choices. The threshold Y is also stored in the memory 308. Of course, the order of receiving thresholds X and Y may be reversed.

Next, in a step 406, the BWAS 109 sends a request message to the H.323 terminals, requesting that they return an indication of their available coding algorithms and hierarchies. According to one embodiment, the request is in the form of an RAS message. The request message is received at the H.323 terminals in their coding resource units 111 (see FIG. 2). The terminals' coding resource units 111 access this information, in a manner similar to that in which the terminals access coding information prior to beginning communication with another endpoint. The information is then transferred to the BWAS 109, either in the form of an RAS message or by using H.245 signaling.

In a step 408, the coding algorithms/hierarchy information is received by the BWAS 109 via the network interface 304 and stored by the processor 302 in the memory 308. Next, in a step 410, the BWAS 109, in particular the bandwidth monitor 306, proceeds to monitor system bandwidth usage. A signal representative of system bandwidth usage is provided to the processor 302, which accesses the memory 308 for the threshold value X. The processor compares the system bandwidth usage against the threshold value X, and determines, in a step 412, whether system bandwidth usage has exceeded the threshold X. If not, the bandwidth monitor 306 continues to monitor bandwidth usage (return to step 410). However, if bandwidth usage is determined to exceed the threshold X, then in a step 414, the BWAS 109 sends a command to the H.323 terminals ordering them to adjust their coding hierarchies so that a lower speed codec is employed (the adjustment can be either stepping down to the next fastest allowed coding algorithm or alternatively stepping down directly to a selected algorithm, e.g., the slowest coding algorithm). Again, this may take the form of an RAS message or H.245 signaling. Each H.323 terminal's coding resource unit 111 then adjusts the hierarchy so that the higher-speed, more bandwidth-intense coding algorithms are not employed.

The determination of how far to lower the bandwidth in step 414 may be based on a variety of factors, including load, traffic expectations, and the like. It being understood that any of a variety of methods may be employed, an exemplary method is described as follows. The BWAS 109 calculates the remaining network bandwidth divided by the number of idle users to obtain a demand, D, which is the demand allocable to each of the users if it placed a call. The demand, D, is then modified by two pre-configured factors which are stored in the memory 308. The first factor is the percentage of voice load allowed (VLA), representative of, for example, the percentage of bandwidth remaining after data usage is determined. Thus, if data calls are allowed 60% of network bandwidth, then VLA=40%. The second factor is the percentage of calls expected to be activated (EA). For example, if there are 100 terminals, and only half are expected to be active at any time, then EA=50%. A modified demand (MD) is then calculated according to the following formula: MD=(D*VLA)/EA. For example, if the threshold X were to be exceeded such that 1 Mbps network bandwidth is remaining, and 50 idle users were present, then D would be 1 Mbps/50 users=20 kilobits per second (kbps)/user. The modified demand (MD) would then be (20 kbps/user*40%)/50%=16 kbps/user.

Based on the modified demand (MD), the BWAS 109 determines that the first coding algorithm in each H.323 terminal's hierarchy that is lower than MD should be selected. In the example above, the first coding algorithm that is 16 kbps or lower should be selected. If the terminal does not have such a coding algorithm, the next lowest is to be employed (alternatively, the lowest coding algorithm is to be employed). Each H.323 terminal is provided with a message from BWAS 109 directing it to reset its coding algorithm to the appropriate coding algorithm.

Returning to FIG. 4, the BWAS 109 continues in step 416 to monitor system bandwidth usage. Again, the bandwidth monitor 306 provides a signal to the processor 302 indicative of system bandwidth usage. In response, the processor 302 accesses the memory 308 for the threshold Y. As discussed above, the threshold Y is the bandwidth usage threshold below which the default hierarchy of coding algorithms may be employed. The processor 302 then compares the bandwidth usage provided from the bandwidth monitor 306 with the threshold Y, in a step 418. If usage has not fallen below the threshold Y, then the bandwidth monitor continues to monitor bandwidth usage (return to step 416). If, however, the bandwidth usage has fallen below the threshold Y, then in a step 420, the BWAS 109 sends a message to each of the H.323 terminals directing them to restore their predetermined choice of coding algorithms or, alternatively, a BWAS-specified coding algorithm (for example, the re-adjustment can be stepping up to the next fastest coding algorithm or alternatively stepping up directly to a selected algorithm, e.g., the fastest coding algorithm). Each terminal's coding resource unit 111 then re-adjusts the coding algorithm hierarchy accordingly.

Figure 5:
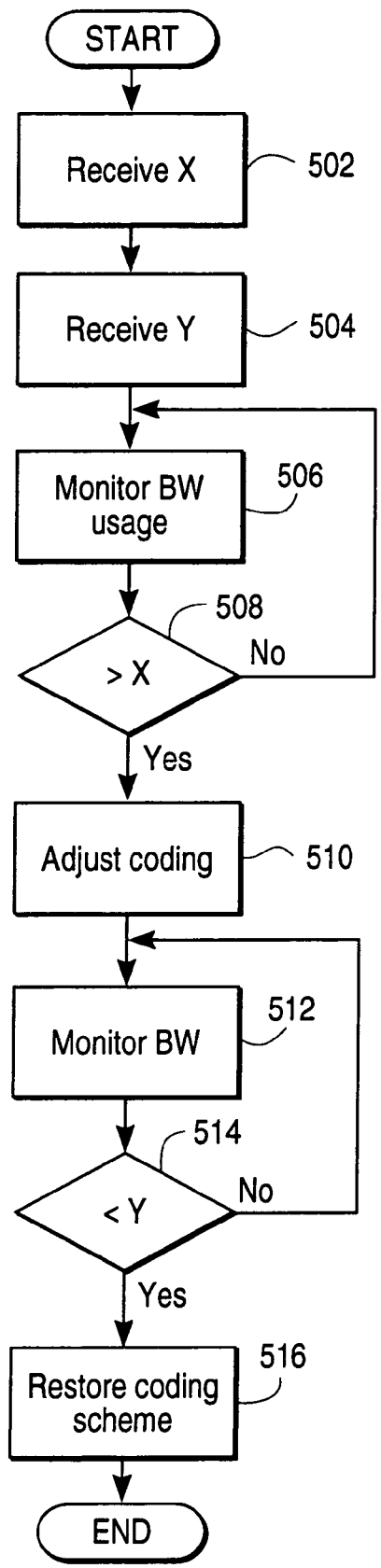
FIG. 5 is a flowchart illustrating operation of another embodiment of the invention.

An alternative embodiment of a method for adjusting bandwidth according to the present invention is described with reference to FIG. 5. In particular, FIG. 5 is a flowchart illustrating a method in which coding algorithm information is not required by the BWAS 109. Instead, the BWAS 109 simply monitors bandwidth usage and orders each H.323 terminal to adjust to slower coding algorithms according to a fixed, predetermined schedule along the algorithm hierarchy.

In a step 502, the bandwidth allocation server (BWAS) 109 receives configuration information concerning the bandwidth threshold X, which is the threshold that must be met before reducing codec speeds. The threshold X, typically measured in Mbps, is stored in the memory 308. In a step 504, the BWAS 109 similarly receives configuration information concerning the threshold Y, which is the threshold that must be met before restoring coding algorithm choices. The threshold Y is also stored in the memory 308. Of course, the order of receiving thresholds X and Y is not important.

Next, in a step 506, the BWAS 109, more particularly the bandwidth monitor 306, monitors the system bandwidth usage. Again, a signal representative of system bandwidth usage is provided to the control processor 302, which accesses the memory 308 for the threshold value X. The processor compares the system bandwidth usage against the threshold value X, and determines in a step 508 whether system bandwidth usage has exceeded the threshold X. If not, the bandwidth monitor 306 continues to monitor bandwidth usage (return to step 506). However, if bandwidth usage is determined to exceed the threshold X, then in a step 510 the BWAS 109 sends a command to the H.323 terminals ordering them to adjust their coding hierarchies (the adjustment being either stepping down to the next fastest coding algorithm or alternatively stepping down directly to a selected algorithm, e.g., their slowest coding algorithms). Each H.323 terminal's coding resource unit 111 then adjusts the hierarchy so that the higher-speed, more bandwidth-intense coding algorithms are not employed.

According to this embodiment, the selection in step 510 of the slower coding algorithm is done on a predetermined basis. For example, the BWAS 109 may send an RAS command or H.245 signaling to the H.323 terminals to step down to the next fastest coding algorithm. Alternatively, the BWAS 109 may command the H.323 terminals to step down directly to their slowest coding algorithms. The coding resource unit 111 of each of the H.323 terminals receives the message and adjusts its terminal's coding hierarchy.

Once the H.323 terminals have re-set their default choices for coding algorithms, the bandwidth monitor 306 continues to monitor bandwidth usage, in a step 512. The bandwidth monitor 306 provides a signal indicative of bandwidth usage to the processor 302. The processor 302, in turn, accesses the memory 308 for the threshold value Y. The processor then performs a compare operation, comparing the threshold value Y with the bandwidth signal received from the bandwidth monitor 306, in a step 514. If the bandwidth usage level is above or equal to Y, then the system continues to monitor usage (return to step 512). If, however, bandwidth usage levels drop below the threshold value Y, then the processor 302 issues a command onto the network allowing the H.323 terminals to re-adjust their coding algorithm hierarchies at step 516. Again, this may take the form of an RAS message or H.245 signaling, with the re-adjustment being either stepping up to the next fastest coding algorithm or alternatively stepping up directly to a selected algorithm, e.g., the fastest coding algorithm. Each H.323 terminal's coding resource unit 111 then adjusts accordingly the coding hierarchy so that the higher-speed, more bandwidth-intense coding algorithms are allowed to be employed.

In the various specific embodiments of the present invention discussed above, the bandwidth can thus be continuously monitored for changes in network traffic such that dynamic adjustment of the coding algorithms is accomplished.

Figure 6:
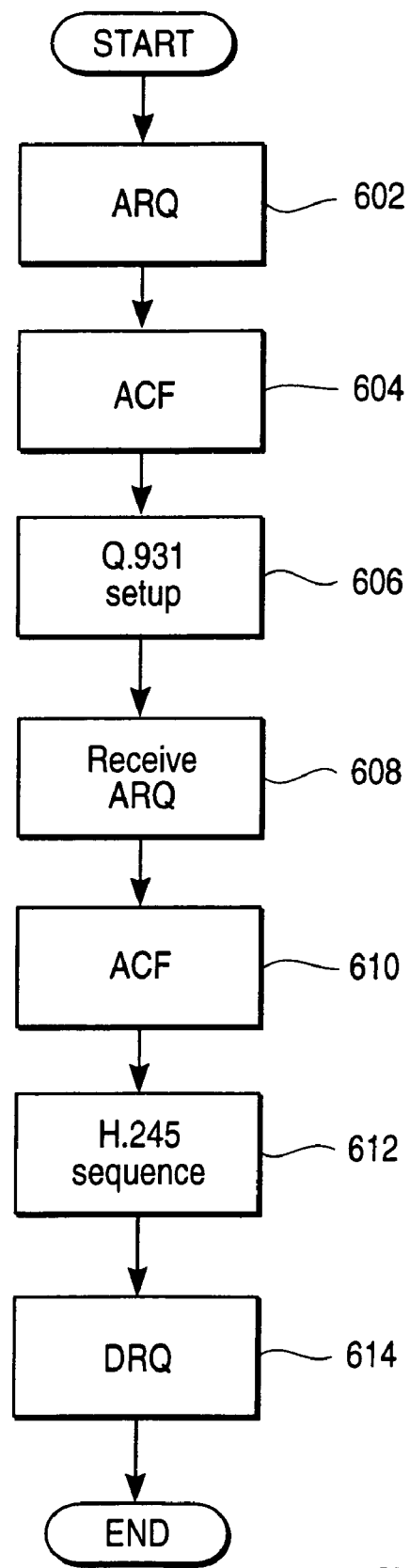
FIG. 6 is a flowchart illustrating communication employing an embodiment of the invention.

In the above embodiments, once the H.323 terminals receive their new coding hierarchies, calls are processed in the standard fashion. Thus, for example, turning now to FIG. 6, a flowchart illustrating call setup employing a coding hierarchy adjustment system according to the invention is shown. In particular, in a step 602, a calling H.323 terminal issues an Admission Request (ARQ) message to the gatekeeper 108. In a step 604, the gatekeeper 108 accepts by issuing an Admission Confirm (ACF) message (it is noted that the gatekeeper 108 could reject by responding with an Admission Reject (ARJ) message, but for purposes of illustration, it is assumed that an ACF message is sent). In a step 606, the calling H.323 terminal sends a Q.931 Setup message to the called H.323 terminal. In a step 608, the called H.323 terminal sends an ARQ message to the gatekeeper 108 which responds with an ACF message in a step 610 (again, a reject message may also be provided, rather than an accept message). Once this acceptance has issued, an H.245 sequence follows, in a step 612, in which the calling and called H.323 terminals communicate with one another concerning the common coding algorithm which is to be employed. As discussed above, the H.323 terminals must find a common algorithm. The H.323 terminals step through their hierarchies until one is found. According to the present invention, this determination may be based on use of the bandwidth-adjusted new coding hierarchy. It is noted that the H.245 sequence may also include bandwidth requests and allocations according to the H.323 Recommendation. Such standard bandwidth messaging is unaffected by the present invention, except to the extent that the individual H.323 terminals base their bandwidth requests upon bandwidth requirement determinations that have resulted after their readjustments in response to the BWAS 109.

Finally, when the call is terminated, in a step 614, both H.323 terminals send a Disengage Request (DRQ) message to the gatekeeper 108. In turn, the gatekeeper 108 responds with a Disengage Confirm (DCF) message.

Figure 7:
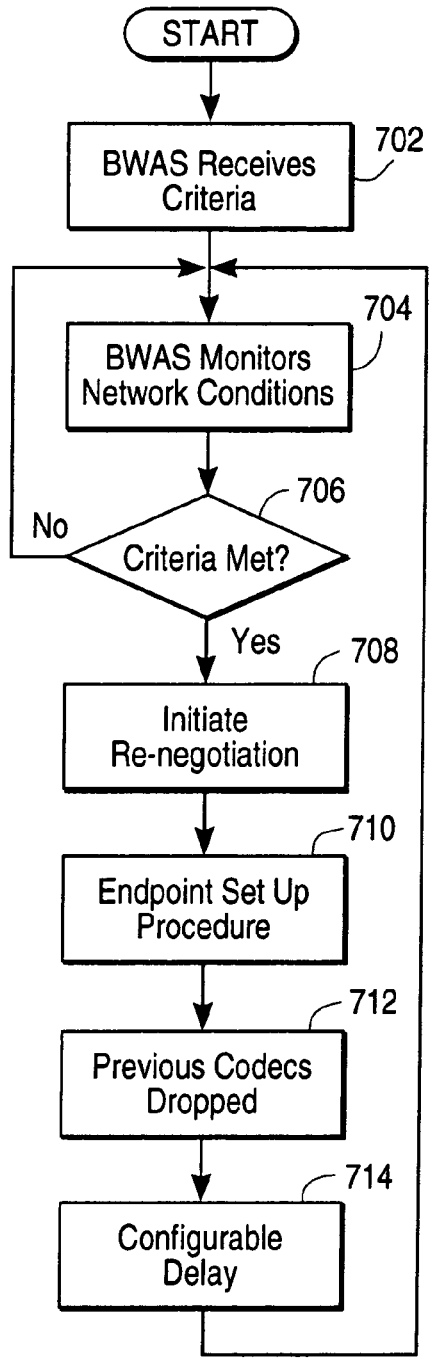
FIG. 7 is a flowchart illustrating operation of an embodiment of the invention.

As discussed above, one aspect of the present invention is the renegotiation of codec usage while calls are ongoing. FIG. 7 is a flowchart illustrating this procedure. In a step 702, in a manner similar to that described above, the BWAS 109 is provided with the bandwidth renegotiation criteria, that is, the criteria or thresholds which must be met before the BWAS causes renegotiation of codecs. In addition, the BWAS stores selection criteria identifying which endpoints have their codecs renegotiated. Selection criteria may be based, for example, on QoS and current bandwidth allocation, or whether the call is internal or external, or other predetermined criteria. For example, as will be discussed in greater detail below, a number of existing calls may be associated with a medium QoS level; that is, a high QoS level is not required. The subsequent call may be associated with a high QoS, i.e., it is important that the connection is of high quality. If the difference between the QoS levels meets a threshold, then the existing call(s) will have its (or their) codecs renegotiated to a lower level. If codecs have already been renegotiated lower once, then the BWAS monitors whether they should be renegotiated still lower, or whether they can be restored to their original levels.

Returning to FIG. 7, in a step 704, the BWAS 109 and, particularly, the bandwidth monitor 306 monitors the condition of the network and, particularly, bandwidth usage. If the criteria for re-negotiation of codecs are not met, as determined in a step 706, then the process returns to step 704, i.e., monitoring continues. However, if one or more of the criteria are met, then in a step 708, the BWAS 109 sends one or more control signals to the endpoints directing them to renegotiate their codecs. As discussed above, this may be a command to negotiate lower speed codecs or higher speed codecs. In a step 710, the endpoints renegotiate their codecs, using standard H.323 signaling. The previous codecs are then dropped, in a step 712. The system then cycles back to step 704, i.e., network monitoring, after an optional configurable delay (step 714) to prevent the possibility of the same connection from being repeatedly downgraded.

As discussed above, a number of criteria may be used to determine whether a renegotiation of codec speeds for one or more existing connections is to occur. One method of doing so is similar to the percent-data traffic allowed method described above. That is, if the amount of data traffic exceeds a predetermined threshold, the codec renegotiation process is undertaken.

Figure 8:
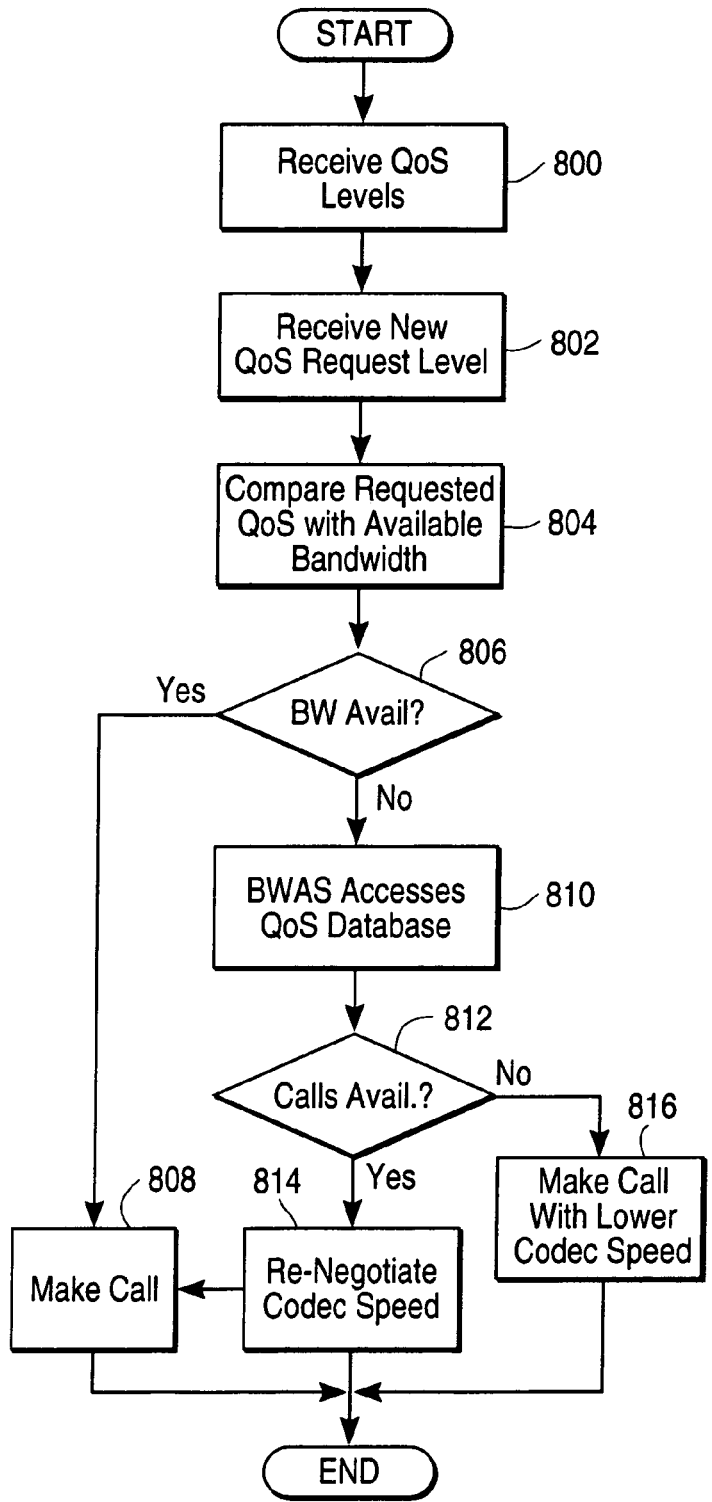
FIG. 8 is a flowchart illustrating bandwidth monitoring according to another embodiment of the invention.

Another method, employing QoS levels, is described with reference to FIG. 8. In a step 800, the BWAS 109 saves the requested QoS levels for existing calls as well as the actual QoS level being provided. For example, the control processor 302 may save this information in the memory 308. In a step 802, the BWAS 109 receives a new call setup request QoS level from an H.323 endpoint during call setup. In a step 804, the BWAS 109 compares the requested QoS level to available bandwidth. If the requested bandwidth is available, as determined in a step 806, then the call is completed in a step 808. However, if in step 806, it was determined that the requested bandwidth was not available, then in a step 810, the BWAS 109 accesses a database to determine whether any existing calls are available which can have their bandwidths lowered. For example, if there exists a current connection having a lower QoS than the requested one, the existing connection's QoS may be downgraded. Alternatively, if there exist connections whose QoS is presently more than needed or requested, the connection may be eligible to have its codec renegotiated. Similarly, various connections may be pre-set in a hierarchy identifying whether they can be renegotiated. In any case, if no such connections are available, as determined in a step 812, then in a step 816, the requested connection is completed at a lower bandwidth. If, however, the existing connections may be downgraded, the renegotiate lower codec speed process is undertaken in a step 814, as described above, and the call is made (step 808).

As noted above, control and call signaling in particular embodiments is generally standard H.323 signaling. However, one implementation of the present invention provides additional commands to effect codec renegotiation.

Figure 9:
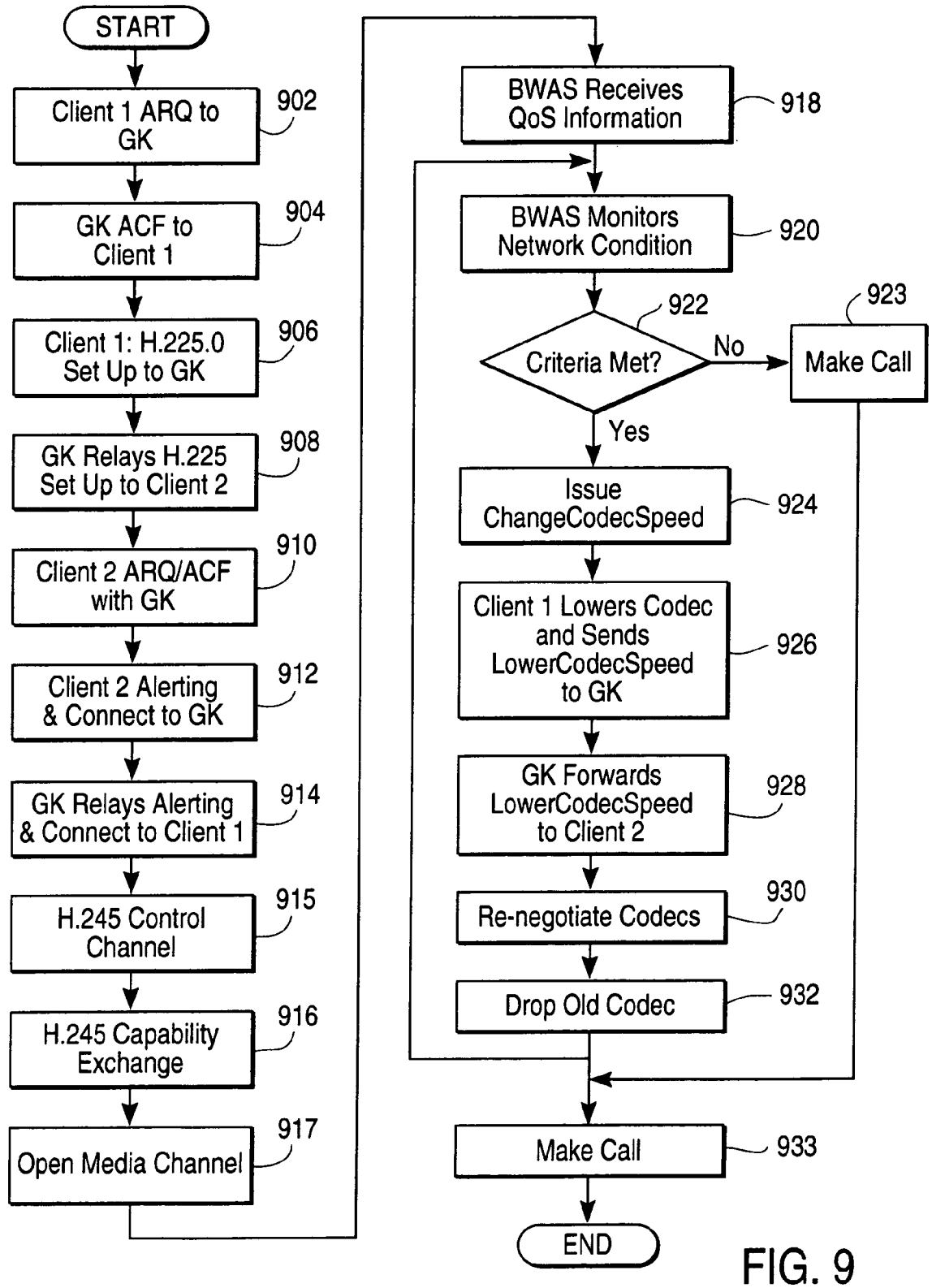
FIG. 9 is a flowchart illustrating operation of an embodiment of the invention.
Figure 10:
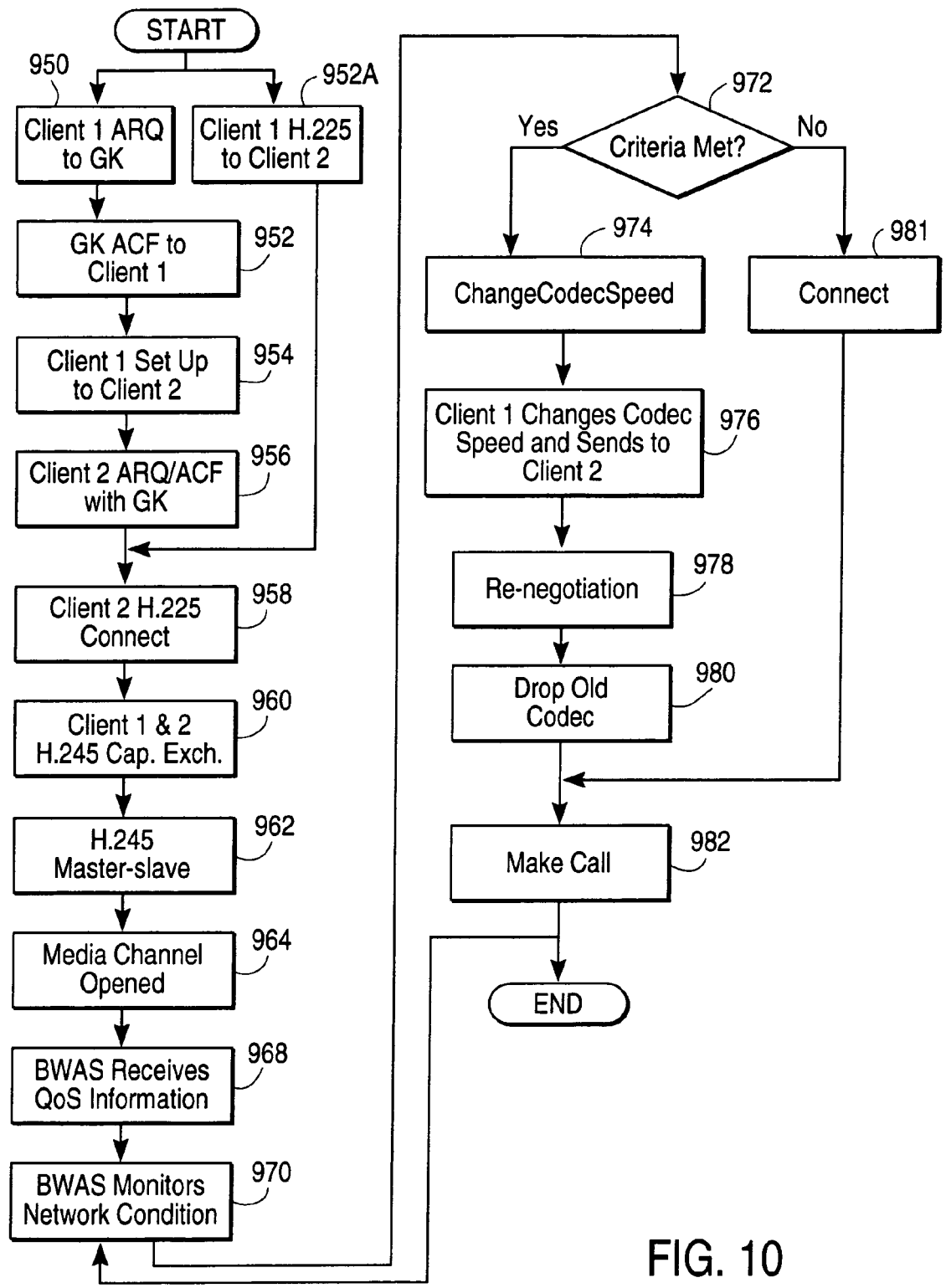
FIG. 10 is a flowchart illustrating operation of another embodiment of the invention.

In particular, with reference to FIG. 9, in a step 902, an endpoint Client 1 wants to establish a call to another endpoint, Client 2. The endpoint Client 1 sends an ARQ message (AdmissionRequest) to the gatekeeper GK. The gatekeeper GK responds with an ACF (AdmissionConfirm) message to Client 1, in a step 904. The ACF message includes a Call Signaling Transport Channel Address of the gatekeeper GK. In a step 906, in response to the ACF message, the endpoint Client 1 sends an H.225.0 setup message to the gatekeeper GK, including a Globally Unique Call Identifier to identify the call.

In a step 908, the gatekeeper GK relays the H.225.0 setup message to the endpoint Client 2. In response, in a step 910, the endpoint Client 2 conducts an ARQ/ACF exchange with the gatekeeper GK. In a step 912, the endpoint Client 2's sends H.225.0 Alerting and Connect messages to the gatekeeper GK as the call progresses to the connect state. The gatekeeper GK, in turn provides the Alerting and Connect messages to the endpoint Client 1 In a step 914. The Alerting or Connect message includes the Gatekeeper H.245 Control Channel Transport Address, which is used, in a step 915, to establish the H.245 control channel. Next, an H.245 capability exchange is undertaken, in a step 916. In a step 917, the media channel is opened between endpoint Client 1 and Client 2.

Then, in a step 918, the BWAS 109 receives the QoS information regarding the call that is being established. In a step 920, the BWAS monitors the condition of the network. In a step 922, if the particular change codec criteria have been met, then in a step 924, the BWAS 109 causes the gatekeeper GK to issue a ChangeCodecSpeed command to the relevant calling party endpoint(s), in this example, endpoint Client 1. The ChangeCodecSpeed command includes a "higher" or "lower" parameter, as appropriate. Then, in a step 926, the endpoint Client 1 adjusts its codec speed and sends a LowerCodecSpeed command (or, if appropriate, a HigherCodecSpeed command) to the gatekeeper GK, which identifies the existing call whose codec is to be renegotiated. In a step 928, this command is forwarded to the endpoint Client 2. The codec renegotiation then takes place over the H.245 control channel, in a step 930. Once the renegotiation has occurred, the previously-used codec(s) are dropped, in a step 932, the system cycles back to step 920 (after an optional configurable delay), and the call is made (step 933). If, in step 922, the criteria had not been met, the communication would have been established without codec renegotiation, in step 923.

A similar command sequence is used in an implementation employing the H.323 direct signaling model. In a step 950, the endpoint Client 1 sends an ARQ message to the gatekeeper GK requesting that a call to endpoint Client 2 be allowed using a direct call model. In a step 952, the gatekeeper GK responds with an ACF message to the endpoint Client 1. The ACF message includes a Call Signaling Transport Channel Address of the endpoint Client 2. In a step 954, in response to the ACF message, endpoint Client 1 sends an H.225.0 Setup message directly to endpoint Client 2. In response to the setup message, in a step 956, the endpoint Client 2 conducts an ARQ/ACF exchange with the gatekeeper GK. Next, in a step 958, the endpoint Client 2 sends an H.225.0 Connect message to the endpoint Client 1 to progress the call to a connect state. In a step 960, the endpoint Clients 1 and 2 exchange H.245 terminal capability messages. In a step 962, the endpoints Client 1 and Client 2 exchange H.245 master-slave determination messages and any other needed H.245 messages. In a step 964, a media channel is opened between the endpoints.

Alternatively, the exchange of ARQ/ACF messages may be omitted. That is, a direct call may be established between the endpoints client 1 and 2 with no involvement of gatekeeper GK. In this scenario, steps 950, 952, and 956 are omitted. That is, in a step 952A, the endpoint Client 1 sends an H.225.0 message directly to endpoint Client 2. This causes endpoint Client 2 to process the received H.225.0 Setup message. Next, steps 958, 960, 962, and 964 as described above are followed.

Then, in a step 968, the BWAS 109 receives the QoS information regarding the call that is being established. In a step 970, the BWAS monitors the condition of the network. In a step 972, if the particular change codec criteria have been met, then in a step 974, the BWAS 109 issues a ChangeCodecSpeed command to the relevant calling party endpoint(s), in this example, endpoint Client 1. The ChangeCodecSpeed command includes a "higher" or "lower" parameter, as appropriate. Then, in a step 976, the endpoint Client 1 adjusts its codec speed and sends a LowerCodecSpeed command (or, if appropriate, a HigherCodecSpeed command) directly to the endpoint Client 2. The renegotiation then takes place over the H.245 control channel, in a step 978. Once the renegotiation has occurred, the previously-used codec(s) are dropped, in a step 980, and the call is made, in a step 982, and the system cycles back to monitoring (step 970). If the criteria were not met in step 972, then in a step 981, the connection is made at a lower speed.

What is claimed is:

1. A telecommunications system, comprising:
   a packet switched network;
   one or more telephony devices coupled to said packet switched network, said one or more telephony devices configured to communicate using one or more coding algorithms; and
   a bandwidth allocation server configured to cause a renegotiation of which of said coding algorithms said one or more telephony devices communicates with while said one or more telephony devices are communicating using a predetermined coding algorithm;
   wherein said bandwidth allocation sever is adapted to transmit one or more renegotiation signals to one or more telephony devices involved in a communication a telephony device seeks to join and one or more telephony devices involved in another communication,
   wherein said renegotiation is based on a modified demand (MD), wherein said modified demand is determined based on a demand (D) calculated by dividing available network bandwidth by the number of idle users, a percentage of voice load allowed (VLA), and a percentage of calls expected to be activated (EA).

2. A telecommunications system in accordance with claim 1, said packet switched network being H.323 compatible.

3. A telecommunications system in accordance with claim 1, said bandwidth allocation server configured to initiate said re-negotiation if one or more existing connections have a quality of service (QoS) level which may be altered.

4. A telecommunications system in accordance with claim 1, said bandwidth allocation server configured to initiate said renegotiation if a level of data traffic exceeds a predetermined threshold.

5. A telecommunications system in accordance with claim 1, wherein said renegotiation is responsive to a modified threshold determination, wherein said modified demand is calculated substantially according to the following: $MD=(D*VLA)/EA$.

6. A method for operating a telecommunication system, comprising:
   monitoring network usage at a bandwidth allocation server, said monitoring including monitoring a plurality of conference calls; and
   changing codec speed for said plurality of conference calls based on said monitoring network usage, responsive to signals from said bandwidth allocation server, wherein said changing codec speed based on said monitoring network usage is based on a determination of a modified demand (MD), wherein said modified demand is determined based on a demand (D) calculated by dividing available network bandwidth by the number of idle users, a percentage of voice load allowed (VLA), and a percentage of calls expected to be activated (EA).

7. A method according to claim 6, including determining whether an existing connection has a lower quality of service (QoS) than another connection, and changing said codec speed for said existing connection responsive to said determining.

8. A method according to claim 6, including determining whether data traffic on a monitored network has exceeded a predetermined threshold.

9. A method in accordance with claim 6, wherein said changing codec speed is responsive to a modified threshold determination, wherein said modified demand is calculated substantially according to the following: $MD=(D*VLA)/EA$.

10. A telecommunications device, comprising:
    means for establishing a connection with another telecommunications device using a first coding algorithm; and
    means for changing a communication over said connection from said first coding algorithm to a second coding algorithm, said changing means responsive to one or more signals from a bandwidth allocation server that monitor network conditions, said bandwidth allocation server adapted to transmit said signals to all active multimedia entities, said changing means including means for changing based on a determination of a modified demand (MD), wherein said modified demand is determined based on a demand (D) calculated by dividing available network bandwidth by the number of idle users, a percentage of voice load allowed (VLA), and a percentage of calls expected to be activated (EA).

11. A telecommunications device according to claim 10, wherein said changing means including means for monitoring network usage, said monitoring means monitors said network usage for actual and requested quality of service (QoS) levels.

12. A telecommunications device according to claim 11, wherein said changing means changes from said first coding algorithm to said second coding algorithm if said connection has a lower QoS than another connection.

13. A telecommunications device in accordance with claim 10, wherein said determination changing means is responsive to a modified threshold determination, wherein said modified demand is calculated substantially according to the following: $MD=(D*VLA)/EA$.

14. A telecommunications system, comprising:
    a packet switched network;
    one or more telephony devices coupled to said packet switched network, said one or more telephony devices configured to communicate using one or more coding algorithms; and
    a bandwidth allocation server configured to cause a renegotiation of which of said coding algorithms said one or more telephony devices communicates with while said one or more telephony devices are communicating using a predetermined coding algorithm;
    wherein said bandwidth allocation server is adapted to transmit one or more renegotiation signals to one or more telephony devices involved in a communication a telephony device seeks to join and one or more telephony devices involved in another communication;

wherein said bandwidth allocation server is configured to cause said renegotiation responsive to a modified demand threshold determination, wherein a modified demand is calculated substantially according to the following:

MD=(D*VLA)/EA, where MD is modified demand, D is demand calculated by dividing available network bandwidth by the number of idle users; VLA is percentage voice load allowed, and EA is percentage of calls expected to be activated.

* * * * *